G. W. MALCOLM & F. T. MUNTON.
TREATMENT OF BRINE.
APPLICATION FILED FEB. 18, 1911.
1,025,411.
Patented May 7, 1912.
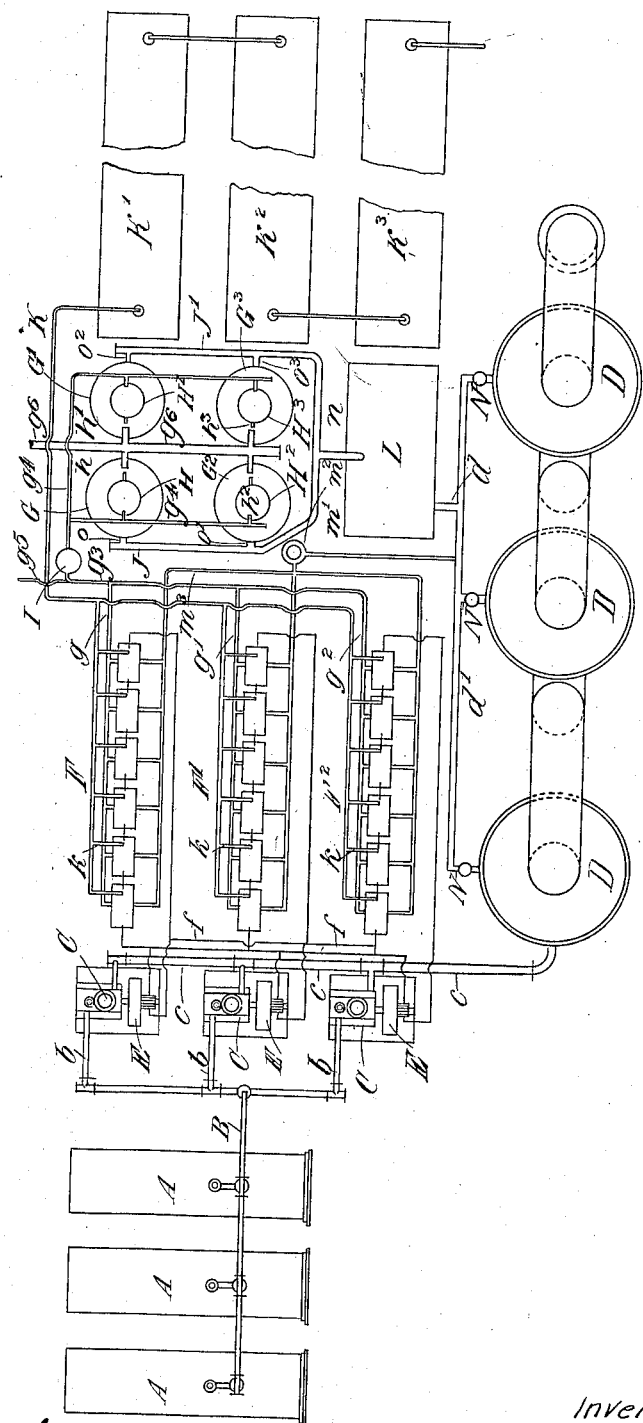
Witnesses:
Josephine McGuire
Frank Hennessy
Inventors:
George William Malcolm
& Frederick Thomas Munton
By Pennie & Goldsborough
Attys.

UNITED STATES PATENT OFFICE.

GEORGE WILLIAM MALCOLM, OF DAVENHAM, AND FREDERICK THOMAS MUNTON, OF WINSFORD, ENGLAND, ASSIGNORS TO THE SALT UNION, LIMITED, OF LIVERPOOL, ENGLAND.

TREATMENT OF BRINE.

1,025,411.        Specification of Letters Patent.        Patented May 7, 1912.

Application filed February 18, 1911. Serial No. 609,313.

*To all whom it may concern:*

Be it known that we, GEORGE WILLIAM MALCOLM and FREDERICK THOMAS MUNTON, both subjects of the King of Great Britain, residing, respectively, at Davenham, and Rosslyn, Winsford, both in the county of Chester, England, have invented certain new and useful Improvements in or Relating to the Treatment of Brine, of which the following is a specification.

This invention relates to the manufacture of salt from natural brine by the vacuum process of evaporation in which the calcium and magnesium salts are removed before evaporation of the brine by electrolyzing the brine to form sufficient sodium hydrate to decompose the said salts and precipitate the magnesium and most of the calcium as hydrates and then treating the brine with carbonic acid to complete the removal of the calcium, and has particular reference to the processes described in the specifications of the co-pending applications No. 459654 of 1908 and No. 551484 of 1910, the object being to provide for the more economic production of the salt.

According to the present invention a sufficient quantity of brine is electrolyzed to form sodium hydrate equivalent to the magnesium and calcium salts present in the mass of brine to be treated, and the sodium hydrate is partially carbonated so that on mixing the electrolyzed brine with the raw brine the magnesium and calcium salts are precipitated together.

The power for driving the engines for working the dynamos employed in generating the current for use in the electrolyzing step above referred to is derived as in the prior processes from the steam which is generally used for evaporating purposes only and to a small extent for driving the air and other pumps which are indispensable accessories to a vacuum plant, and the exhaust from such engines, which may be superheated, is passed directly to the vacuum plant to furnish the heat necessary for effecting the evaporation of the brine.

In order that the said invention may be clearly understood and readily carried into effect, we will proceed to describe the same more fully with reference to the accompanying drawing in which we have represented diagrammatically a plant adapted to accomplish the manufacture of salt according to the improved method.

In this drawing, A, A, A, indicate steam generators for producing high pressure steam which passes, by way of the pipe B and branch pipes $b$, $b$, $b$, to the respective non-condensing engines C, C, C, the exhaust steam from these engines being conveyed by a pipe $c$ to the evaporating pans, D, D, D. The engines C, C, C, are arranged to drive electric generators E, E, E, whereby electric current is supplied to electrolyzing cells of any suitable type such as F, F', F². The electric generators will be available for supplying current for lighting and other uses and the excess of current will be available in the above connection or for obtaining calcium carbid or other chemicals; the chlorin from the electrolytic cells may be used for making carbon tetrachlorid, chloroform or any chlorinated article of commerce. If thought desirable, an excess of caustic soda solution may be produced and placed on the market either as a solution or in solid form after being subjected to evaporation. The current is conducted to the cells F, F', F², by way of the leads $f\!f$ the arrangement of these leads admitting of the connection of any one of the dynamos with any series of cells. Brine is supplied to the cells by hand or by any other convenient means and is electrolyzed therein, caustic soda being produced.

The electrolyzing cells are connected to a carbonator I by pipes $g$, $g'$, $g^2$, $g^3$ and the carbonator is in turn connected to the mixing vessels G, G', G², G³ by the pipe $g^4$. Sufficient sodium hydrate is drawn from the cells F to be chemically equivalent to the magnesium and calcium salts contained in the mass of raw brine to be treated, and is passed through the carbonator I, in which it is carbonated by means of washed flue gases to such an extent that the carbonated alkali produced will be chemically equivalent to the calcium salts present in the brine under treatment. Thus a solution is sent forward through the pipes $g^4$ which consists of a mixture of caustic and carbonated alkali chemically equivalent to the magnesium and calcium salts contained in the brine. It will be seen that the improved process presents the advantage that the re-agents required are produced in solution in the necessary proportion and that the cost of separation is avoided. The quantity of sodium hydrate or electrolyzed brine admitted to the carbonator is regulated by suitable valves, the degree of carbonation being determined by chemical analysis. If desired only part of the electrolyzed brine may pass to the carbonator, the remainder being mixed therewith after carbonation. The flue gases employed for carbonating the electrolyzed brine may be drawn from any convenient source, and be forced through the carbonator by an air compressor or other suitable means. Raw brine is introduced into the mixers G simultaneously with the alkaline solution from the carbonator I, and any excess of caustic soda after supplying the requisite quantity to the carbonator I may be drawn off by way of the pipe $g^5$.

The quantity of alkaline solution or electrolyzed brine admitted is regulated by suitable valves or cocks as will be readily understood so as to correspond with the flow of raw brine into the mixing apparatus. The solution of caustic and carbonated alkali passes from the carbonator I into measuring tanks H, H', $H^2$, $H^3$, where the quantity required for the brine in the respective mixing vessels G is measured. The raw brine is run into the said mixers along with the solution of caustic and carbonated alkali from the measuring tanks H through the pipes $h$, $h'$, $h^2$, $h^3$, and the magnesium and calcium salts are precipitated as hydrate and carbonate respectively, and periodically emptied from the bottom of the mixers. After mixing the brine is allowed to settle and the clear liquor decanted off from the top of the vessels G by float pipes (not shown) which are in communication with the pipes J, J', by means of connections $o$, $o'$, $o^2$, $o^3$. The flow of purified brine from the mixing tanks G is regulated by suitable valves and said brine is carried through the pipe $n$ to the stock tank L. From the stock tank L the brine is fed or pumped to the evaporators D through the pipes $d$, $d'$. The brine thus purified and freed from magnesium and calcium salts is now conducted by way of the pipe $d$ to the distributing pipe $d'$ and thence to the evaporating pans D for the production of salt in the well known manner of vacuum evaporation. Suitable heaters N may be provided in the several branches of the distributing pipe $d'$ so as to heat the purified brine and remove all traces of impurities before the same enters the evaporating pans D. A small part of the purified brine is conducted back to the cells by way of pipes $m'$, pump $m^2$, and distributing pipe $m^3$ for electrolysis, thus enabling brine free from magnesium and calcium salts to be used in the cells. The chlorin which results from the electrolysis of the brine in the cells F, F', $F^2$ may be collected by the pipes $k$ and conducted by way of the pipe K to the chlorinating chambers K', $K^2$, $K^3$ where bleaching powder may be manufactured in the well known manner by absorbing the chlorin by means of lime. The cycle of operations is, therefore, by means of the steam, to first drive the engines and the current generating plant; the exhaust steam from the engines is passed by means of pipes or other conduits to the vacuum plant where it effects the evaporation and the making of the salt from the previously electrolyzed and purified brine, which is led into the evaporating pans.

The resultant by-products are treated in any known manner to convert or render the same into commercial commodities for use in the arts. Thus the process may be carried on continuously and with great economy and profit.

What we claim and desire to secure by Letters Patent of the United States is:—

1. In the manufacture of salt from natural brine by the vacuum process of evaporation, the herein described method of procedure consisting in electrolyzing a sufficient quantity of brine to form sodium hydrate equivalent to the magnesium and calcium present in the mass of brine to be treated, partially carbonating the sodium hydrate, mixing the electrolyzed brine with the raw brine for effecting the precipitation of the magnesium and calcium salts, then separating the precipitated salts, then conducting the purified brine to the evaporating pans which are heated by the exhaust steam from the engines.

2. In the manufacture of salt from natural brine by the vacuum process of evaporation, the herein described method of procedure consisting in electrolyzing a sufficient quantity of brine to form sodium hydrate equivalent to the magnesium and calcium present in the mass of brine to be treated, partially carbonating the sodium hydrate, mixing the partially carbonated sodium hydrate with the raw brine for effecting the precipitation of the magnesium and calcium salts, then separating the precipitated salts, heating the purified brine and finally conducting the same to the evaporating pans which are heated by the exhaust steam from the engines.

3. In the herein described method of manufacturing salt by the vacuum process of evaporation, carbonating the electrolyzed brine prior to mixing the same with the raw brine so as to effect the simultaneous precipitation of the magnesium and calcium salts contained in the raw brine.

In testimony whereof we affix our signatures in presence of two witnesses.

GEORGE WILLIAM MALCOLM.
FREDERICK THOMAS MUNTON.

Witnesses:
ARTHUR B. LEATHER,
R. BATTERSBY.

Copies of this patent may be obtained for five cents each, by addressing the "Commissioner of Patents, Washington, D. C."